(12) United States Patent
Adragna et al.

(10) Patent No.: US 6,480,402 B2
(45) Date of Patent: Nov. 12, 2002

(54) START UP CIRCUIT FOR COMMUTATION POWER SUPPLIES

(75) Inventors: Claudio Adragna, Monza (IT); Claudio Spini, Monza (IT)

(73) Assignee: STMicroelectronics, s.r.l., Agrate Brianza (IT)

( * ) Notice: Subject to any disclaimer, the term of this patent is extended or adjusted under 35 U.S.C. 154(b) by 0 days.

(21) Appl. No.: 09/902,297

(22) Filed: Jul. 9, 2001

(65) Prior Publication Data

US 2002/0012256 A1 Jan. 31, 2002

(30) Foreign Application Priority Data

Jul. 18, 2000 (EP) ............................................. 00830502

(51) Int. Cl.[7] ............................................... H02M 1/12
(52) U.S. Cl. .......................................... 363/49; 323/901
(58) Field of Search ............................... 363/49, 53, 56, 363/60, 97, 98; 323/908, 901, 224

(56) References Cited

U.S. PATENT DOCUMENTS

| | | | | |
|---|---|---|---|---|
| 4,079,443 A | * | 3/1978 | Udvardi-Lakos et al. | ..... 363/49 |
| 4,263,645 A | * | 4/1981 | Zellmer | ..... 363/49 |
| 4,500,802 A | * | 2/1985 | Janutka | |
| 5,030,844 A | * | 7/1991 | Li et al. | ..... 307/135 |
| 5,084,811 A | * | 1/1992 | Maige et al. | ..... 363/49 |
| 5,233,508 A | * | 8/1993 | Yamamura et al. | ..... 363/49 |
| 5,815,383 A |   | 9/1998 | Lei | |

* cited by examiner

Primary Examiner—Rajnikant B. Patel
(74) Attorney, Agent, or Firm—Hogan & Hartson, LLP

(57) ABSTRACT

The present invention relates to a start up circuit for commutation power supplies (PWM) or DC/DC converters and to a commutation type power supply comprising such a start up circuit. In an embodiment the start up circuit for commutation power supplies having an input terminal (In) and an output terminal (OUT) comprises: a first current generator (41) able to supply a first prefixed current (I) connected between said input terminal (In) and a first node (45); said first node (45) is coupled to said output terminal (OUT); characterized by further comprising a second current generator (42) able to supply a second prefixed current (K*I) connected between said input terminal (In) and a first terminal of a first controlled switch (44); the value of said second prefixed current (K*I) is greater than or equal to the value of said first prefixed current (I); a second terminal of said first controlled switch (44) is connected to said first node (45); a control circuit (43, V3) of said first controlled switch (44) able to maintain closed said first controlled switch (44) in the case in which the voltage on said output terminal (OUT) is lower than a first prefixed voltage (V3). (FIG. 4).

11 Claims, 2 Drawing Sheets

START UP CIRCUIT FOR COMMUTATION POWER SUPPLIES

The present invention relates to a start up circuit for commutation power supplies (PWM) or DC/DC converters and to a commutation type power supply comprising such a start up circuit.

Most of the integrated control circuits for commutation power supplies require for their starting a current to charge a feeding capacitor of the integrated circuit. Such a current comes from the start up circuit (start-up), constituted, in the simplest case, by a resistance connected to the feeding line of the power circuits of the power supply.

The integrated control circuit activates when the voltage on the capacitor reaches a prefixed value equal to a minimum working threshold voltage of the integrated circuit called start-up voltage. The current supplied by the start up circuit must be greater than the feeding current of the integrated circuit, called start-up current, otherwise the capacitor cannot be charged and the power supply will not be activated. Even, the supplied current must be sufficiently greater than the start-up current in order to charge the capacitor in reasonably brief times (i.e. in less than 1 s).

Besides, in the case in which the start up circuit is realized by means of a resistance, it remains active also when the converter is working and therefore it dissipates power. Particularly in the so-called "universal" power supplies, that is, able to work with both the American power net (110 VAC) and the European one (230 VAC), in a start up circuit able to supply a sufficiently elevated current when fed with 110 VAC, in the case of 230 VAC feeding the current will be proportionally more elevated and the related dissipation will increase in a quadratic way. Since lately there are more and more restrictive requests about the consumption reduction of the power supplies, the start up circuit contribution to the total consumption can be a problem.

Once that the control integrated circuit is activated, its consumption increases greatly, overcoming the current supplied by the start up circuit. The voltage at the capacitor terminals will start decreasing, but at this point the power supply begins to work and it will send a self feeding voltage (take-over voltage) to the control integrated circuit. Then the capacitor supports the working of the control circuit up to reaching the power supply steady state voltage value. The self feeding voltage is generally obtained from an additional winding performed on the power supply transformer to which an opportune rectification and filtration circuit is connected.

The start up circuit has a very important role also in short circuit conditions. The disappearance or the diminution of the self feeding voltage, in response to a short circuit and therefore to the voltage at the terminals of the capacitor under the minimum working threshold of the controller, generally called minimum working voltage, will cause the momentary stop of the converter working. Once it is off, the capacitor will again be charged by the start up circuit up to the reaching of the start-up voltage, and it will reactivate the power supply. If the short circuit condition is still present the previous steps will repeat. The time between two following reactivations of the control circuit depends on the current that the start-up circuit supplies and on the capacitor value. This intermittent working, called hiccup mode, allows, in short circuit, to have in the power supply an average current value lower than those relative to a continuous working in the same conditions, in this way decreasing the dissipation of the power supply circuits that could otherwise be destroyed. It is therefore clear that a low intermittent frequency and accordingly a low starting current is essential for the protection of the converter in case of breakdown.

The start up circuit must therefore have the characteristics of: charging the capacitor quickly and therefore it must supply a relatively high current; decreasing and/or eliminating its consumption once that the power supply is working, and therefore it must supply a relatively low current or nothing; getting an intermittent frequency as lower as possible in short circuit conditions and therefore it must supply a relatively low current.

A system used in the construction of the start up circuits is to charge the capacitor by means of a resistance connected to the feeding line of the supply power devices or connected in series to a diode and applied directly to the AC power net.

The starting time is related to the time constant introduced by the resistance and by the capacitor. The capacitor must be determined in order to be able to supply the control integrated circuit working during the phase in which the voltage generated by the self feeding circuit has not been activated yet. An elevated resistance does not allow a quick starting of the circuit. A low resistance starts the system quickly but penalises the two other cited requirements severely. As already said, this problem is as more remarkable as wider the input voltage range of the converter is. In fact it will be difficult, if not impossible, to find a resistance value that is a good compromise between a starting of the circuit in brief times and a low dissipation.

Another system used in the realization of the start up circuits is to charge the capacitor by means of a low value resistance placed in series with a controlled switch that at the activation of the self feeding voltage is opened. In this way we have a quick charging time, we have not consumption (or however it is reduced) during the normal working of the converter, but we have a high intermittent frequency in case of short circuit.

Another system used in the realization of the start up circuits is that used by the integrated circuit LR645 marketed by the Supertex inc. firm which is a linear voltage regulator, able to charge the capacitor quickly by bringing the voltage at its terminals to a value superior to the start-up voltage of the control integrated circuit. The device is turned off when the self feeding voltage overcomes the voltage supplied by LR645. If the voltage generated by the self feeding circuit decreases in an appreciable way, for instance in low load conditions of the power supply, and it should drop down under the voltage supplied by the LR645, the device would be turned on with consequent elevated power dissipation.

Another system used in the construction of the start up circuit is that used by the integrated circuit LR745 commercialised by the Supertex inc. firm. Such a device charges the capacitor with a prefixed current. When the voltage on the capacitor, during the decreasing due to the activation of the control circuit, goes below a threshold, the device is turned off. To turn it on, the voltage on the capacitor must go below a value inferior to the minimum working voltage of the control integrated circuit. In this way the risk of turning on with a low load is eliminated. In case of short circuit we have only a small increase of the circuit starting time, that is the time necessary for the capacitor voltage to go under the minimum working voltage of the integrated control circuit, but it is not able to assure a sufficiently long time between two following activations of the converter.

In view of the state of the art described, it is an object of the present invention to get a start up circuit for commutation power supplies able to supply a sufficiently elevated current in the phase of starting of the control circuit.

Another object is to increase the time occurring between two following activations during the short circuit of the commutation power supply.

A further object is to reduce the power dissipation of the start up circuit when the commutation power supply is working.

According to the present invention, these and other objects are attained by means of a start up circuit for commutation power supplies having an input terminal and an output terminal comprising: a first current generator able to supply a first prefixed current connected between said input terminal and a first node; said first node is coupled to said output terminal; characterized by further comprising a second current generator able to supply a second prefixed current connected between said second input terminal and a first terminal of a first controlled switch; the value of said second prefixed current is greater than or equal to the value of said first prefixed current; a second terminal of said first controlled switch is connected to said first node; a control circuit of said first controlled switch able to maintain closed said first controlled switch in the case in which the voltage on said output terminal is lower than a first prefixed voltage.

Such objects are also attained by a commutation power supply comprising a control circuit with amplitude modulation of the pulses; a start up circuit of said control circuit with amplitude modulation of the pulses according to claim 1.

The features and the advantages of the present invention will be evident from the following detailed description of a particular embodiment, illustrated as a non-limiting example in the annexed drawings, wherein.

Figure 1:
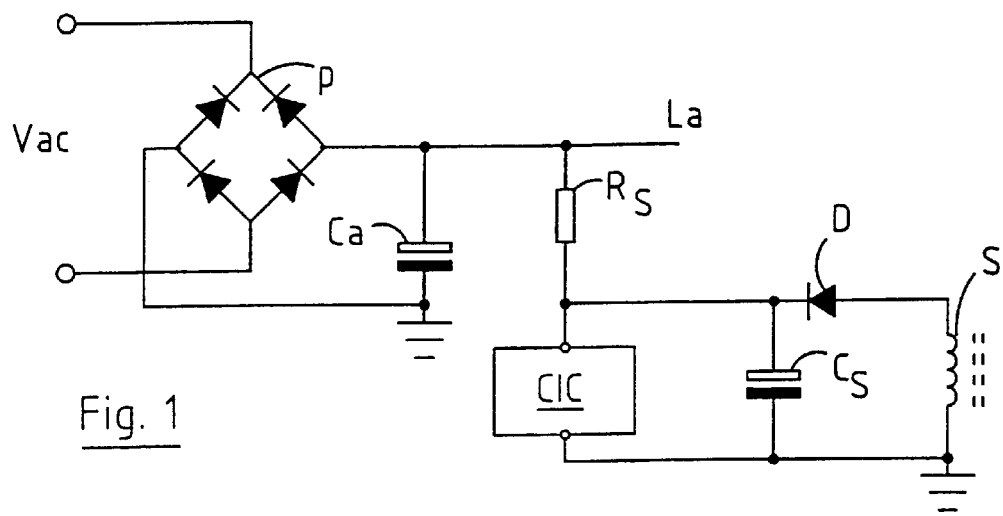
FIG. 1 represents an electric scheme of a start up circuit for commutation power supplies according to the known art.

Referring now to FIG. 1 that represents an electric scheme of a start up circuit for commutation power supplies according to the known art. Particularly, in FIG. 1 there is a diode bridge P connected to the Vac power voltage. The diode bridge P is connected to a filtering capacitor Ca that is placed between a feeding line La of the power devices, not shown, and ground. A resistance Rs is connected to the feeding line La, this resistance feeds an integrated control circuit CIC of the commutation power supply. Another terminal of the integrated circuit CIC is connected to ground, the other terminals of the integrated circuit CIC are not represented in FIG. 1 as in this discussion they are of no interest. An integrated control circuit CIC is for instance the circuit L5991 marketed by the Applicant.

The integrated circuit CIC is also fed through a secondary S of the transformer of the commutation power supply the alternate voltage of which is rectified by a diode D and filtered by a capacitor Cs. In this case the start up circuit is represented by the resistance Rs that is used for charging the capacitor Cs.

Figure 2:
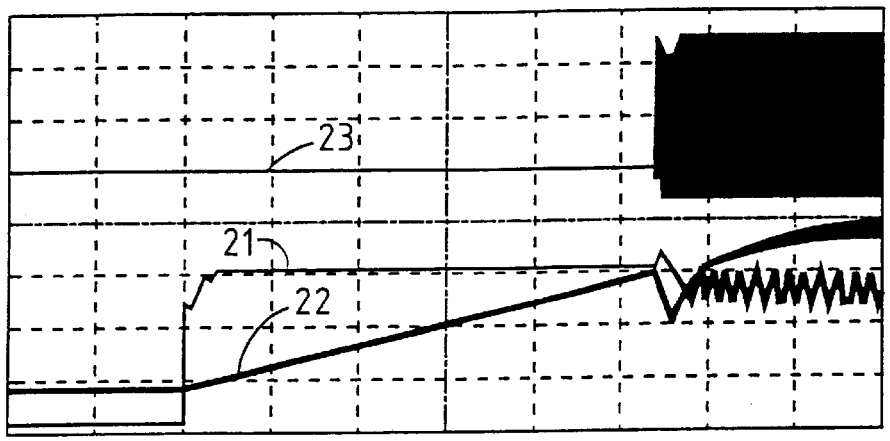
FIG. 2 shows the voltages present in some points of a commutation power supply as displayed by an oscilloscope during the normal working.

FIG. 2 shows the voltages present in some points of a commutation power supply as displayed by an oscilloscope during the normal working, particularly during the starting phase. The voltage represented by the trace 21 is the input voltage of the commutation power supply circuit, that is the voltage present on the feeding line La. The voltage represented by the trace 22 is the voltage present on the capacitor Cs and the voltage represented by the trace 23 is the driving voltage of the power element of the commutation power supply circuit, not shown in FIG. 1.

It can be observed from these two figures that the working of the circuit is as follows. With the presence of the voltage (trace 21) on the feeding line La, the capacitor Cs starts charging as displayed by the trace 22 through the resistance Rs. In the meantime the commutation power supply has not started working yet, trace 23 to ground. When it starts working, that is when the integrated circuit CIC supplies the driving voltage of the power element, visible by means of the trace 23, the capacitor Cs not being able to supply the current necessary for the working of the commutation power supply has a voltage decreasing, visible on the trace 22. The commutation power supply starting however to work, the voltage on the transformer secondary S of the commutation power supply, the so-called self feeding voltage, will be there and will feed the integrated circuit CIC, in fact the trace 22 is seen going to the steady state.

Figure 3:
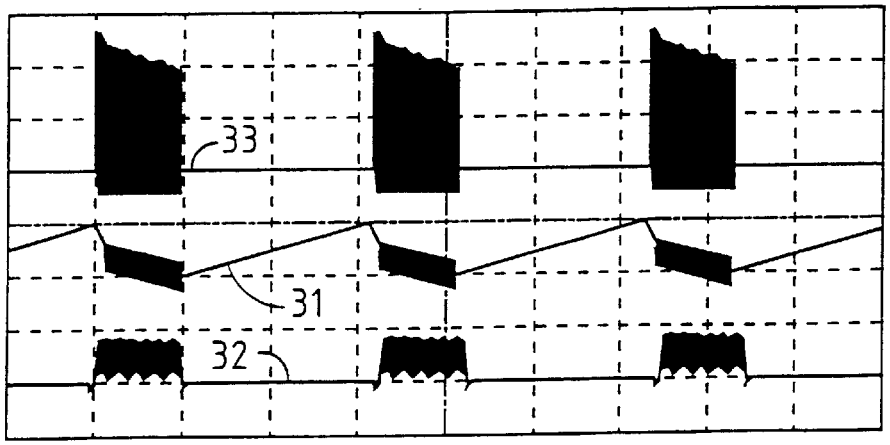
FIG. 3 shows the voltages present in some points of a commutation power supply as displayed by an oscilloscope during the short circuit working.

In FIG. 3 the voltages present in some points of a commutation power supply are shown as displayed by an oscilloscope during the short circuit working. Particularly the voltage represented by the trace 31 is the self feeding voltage that is the voltage present at the terminals of the integrated circuit CIC and of the capacitor Cs. The voltage represented by the trace 32 is the output voltage of the commutation power supply and the voltage represented by the trace 33 is the driving voltage of the power element of the commutation power supply circuit. In case of a short circuit the output voltage of the commutation power supply, trace 32, is substantially equal to 0 V, accordingly the self feeding voltage is also missing, trace 31, at the terminals of the integrated circuit CIC, which turns off. When it is off, the capacitor Cs will start charging again through the resistance Rs, as shown by the trace 31 which is rising, the integrated circuit CIC will supply once more the driving voltage of the power element of the power supply circuit, trace 33, but as it is still in short circuit condition the output voltage will go again to 0 V and the phases previously described will be repeated.

The intermittent time between two following attempts of turning on the integrated circuit CIC depends in this case on the time constant of the resistance Rs and the capacitor Cs.

Figure 4:
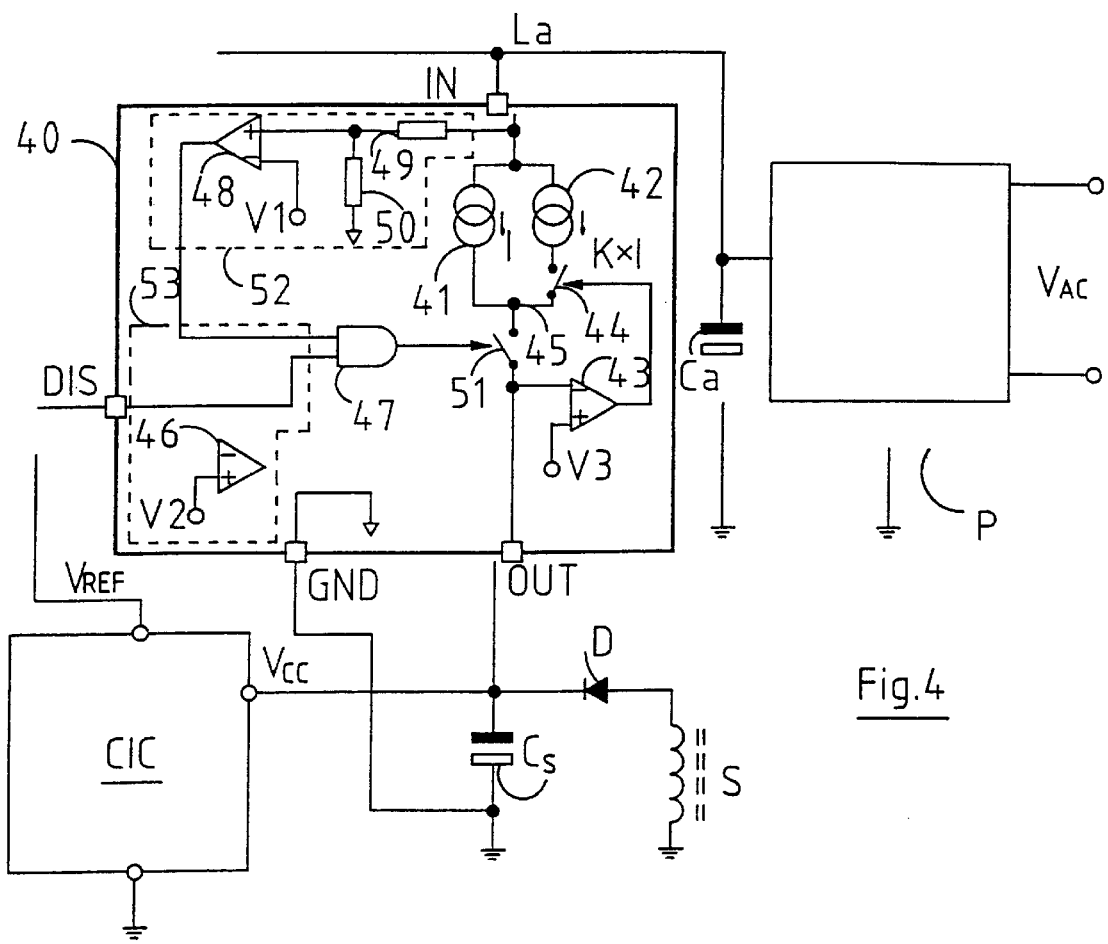
FIG. 4 represents an electric scheme of a start up circuit for commutation power supplies according to the present invention.

FIG. 4 represents an electric scheme of a start up circuit for commutation power supplies according to the present invention. Comparing it with the scheme of FIG. 1 the resistance Rs has been replaced by a start up circuit 40, and the other corresponding elements have the same references.

The start up circuit 40 comprises an input In connected to the feeding line La, and an output OUT connected to a feeding terminal Vcc of the integrated control circuit CIC and to the capacitor Cs.

It comprises a first current generator 41 that supplies a current of value I, connected between the input In and a node 45, a second generator 42 able to supply a current K*I, where K is greater than or equal to 1 and preferably comprised in the interval between 5 and 10, connected between the input In and a terminal of a controlled switch 44, the other terminal of the switch 44 is connected to the node 45. It further comprises an operational amplifier 43 which has a noninverting input to which a prefixed bias voltage V3 is applied, an inverting input connected to the output terminal OUT. The output of the operational amplifier 43 controls the controlled switch 44, particularly maintains closed the switch 44 until the voltage on the output terminal OUT is lower than the voltage V3, and opens it at the overcoming of V3.

In a first embodiment of the present invention the node 45 is directly connected to the output terminal OUT (in this embodiment the switch 51 is not present).

The voltage V3 is to be determined so that it is inferior to the turning off voltage of the control integrated circuit CIC, that is to the minimum working voltage.

Preferably, according to a second embodiment, the start up circuit 40 comprises also a first control circuit 53 of a controlled switch 51, that includes an operational amplifier 46 which has a noninverting input to which a prefixed bias voltage V2 is applied, an inverting input connected to an enable/disable terminal DIS of the start up circuit 40. The output of the operational amplifier 46 controls a controlled switch 51 placed between the node 45 and the output terminal OUT. Particularly it maintains the switch 51 closed until the voltage on the enable/disable terminal DIS is lower than the voltage V2, and opens it at the overcoming of V2. In this second embodiment the operational amplifier 46 controls the controlled switch 51 directly (the AND gate 47 is not present).

The voltage to be applied to the enable/disable terminal DIS is a voltage, that usually has two values, high and low, which voltage indicates with the high value that the integrated control circuit CIC is working and with the low value that the integrated control circuit CIC is not working. For instance for the integrated control circuit L5991 it is the voltage Vref present on the pin 4 and its value is 0V or 5V. Accordingly the voltage V2 is to be chosen so that its voltage is between such values and can discriminate the high value from the low value.

More preferably, according to a third embodiment, the start up circuit 40 comprises a second controller circuit 52 of the switch 51, that can be used in alternative to or in combination with the first controller circuit 53. It includes an operational amplifier 48 which has an inverting input to which a prefixed bias voltage V1 is applied and a noninverting input connected to the input terminal In preferably through a voltage divider formed by the resistances 49 and 50. The output of the operational amplifier 48 controls the switch 51 directly in the case in which the first controller circuit 53 is not present. In the case in which both the first 53 and second 52 control circuits are present the output of the operational amplifier 48 is applied to an input of an AND gate 47 the output of which controls the controlled switch 51, and the output of the operational amplifier 46 is applied to the other input of the AND gate 47.

The operational amplifier 48 maintains the switch 51 open until the voltage on the input terminal In is lower than the voltage V1, and closes it at the overcoming of V1, so as to avoid the problems due to the decreases of the feeding voltage. Preferably, the voltage V1 is comprised in the interval between 0.2 and 2V.

Figure 5:
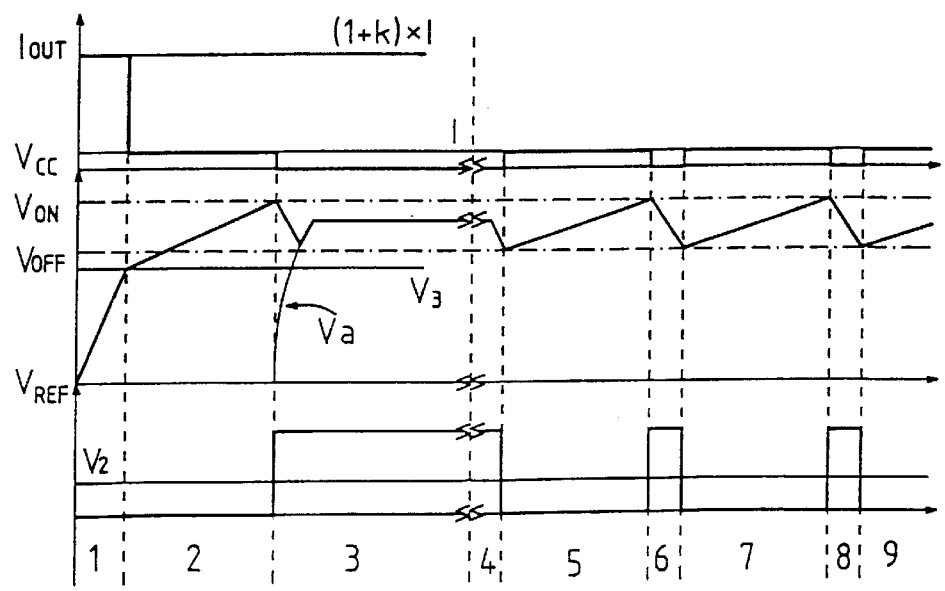
FIG. 5 shows a representation of the voltages present in some points and of the output current of the circuit of FIG. 4 during the normal and the short circuit working.

FIG. 5 shows a representation of the voltages present in some points and of the output current of the circuit of FIG. 4 during the normal working and in short circuit. The graph of FIG. 5 shows, starting from the top, the output current Iout of the start up circuit 40, the voltage Vcc present at the terminals of the capacitor Cs and the voltage Vref present at the terminal DIS, and it is divided in sectors from 1 to 9. The first 3 sectors relate to the normal working, while the sectors from 4 to 9 relate to the case in which there is a short circuit.

The sector 1 relates to the turning on of the power supply: the voltage at the noninverting input of the operational amplifier 48 has overcome the voltage V1, the voltage Vref is at the low value, the voltage on the terminal Vout is inferior to the voltage V3, therefore the switches 44 and 51 are closed, the current flowing from the terminal OUT, equal to (1+K)*I, charges the capacitor Cs. At the reaching of the voltage V3 the operational amplifier 43 opens the switch 44 and the charging curve of the capacitor Cs has a slope lowering, as can be seen in the sector 2 of FIG. 5, as it is now charged only by a current equal to I supplied only by the current generator 41. At the reaching of the start-up voltage Von of the circuit CIC, that for instance for the integrated circuit L5991 is typically equal to 15 V, the circuit CIC starts working as it can also be seen by the rising up of the voltage Vref in the sector 3 and accordingly the switch 51 closes carrying toward zero the current flowing out from the output terminal OUT of the circuit 40.

At the beginning of the sector 3, the momentary lowering of the voltage Vcc at the terminals of the capacitor Cs is also visible, until the arrival of the self feeding voltage Va. From this point on the working of the commutation power supply proceeds thanks to the control of the circuit CIC.

In case of short circuit, as in the sector 4, the voltage Vcc descends till reaching the minimum working voltage Voff, that for instance for the integrated circuit L5991 is typically equal to 10 V, and therefore the circuit CIC turns off, the Vref voltage goes to the low level. In the sector 5 the start up circuit 40 is restarted closing the switch 51, but being the voltage Vcc superior to the voltage V3 the switch 44 stays open and the capacitor Cs charges itself with the only current of the generator 41 equal to I. The voltage Vcc rises up and reaches the starting voltage of the circuit CIC that is the start-up voltage Von, the circuit CIC starts working, the Vref rises up, but there being still the condition of short circuit the voltage Vcc returns to decrease and the phases previously described are repeated until the condition of short circuit has not been eliminated. In fact the sectors 5, 7 and 9 and 4, 6 and 8 are equal.

According to the present invention a quick starting is reached due to the collaboration of the two current generators 41 and 42, but we have an intermittent time between the tuning on and the turning off of the integrated control circuit CIC that only depend on the current of the generator 41 that is inferior or equal to that of the generator 42. The output current of the start up circuit 40 is null during the normal working of the control circuit CIC.

Besides we have a starting of the start up circuit only when the voltage on the feeding line has reached the voltage V1 firmly.

What is claimed is:

1. Start up circuit for commutation power supplies having an input terminal and an output terminal comprising:

a first current generator able to supply a first prefixed current connected between said input terminal and a first node;

said first node is coupled to said output terminal;

a second current generator able to supply a second prefixed current connected between said input terminal and a first terminal of a first controlled switch;

the value of said second prefixed current is greater than or equal to the value of said first prefixed current;

a second terminal of said first controlled switch is connected to said first node; and a control circuit of said first controlled switch is able to maintain closed said first controlled switch when the voltage on said output terminal is lower than a first prefixed voltage.

2. Start up circuit according to claim 1 wherein said control circuit of said first controlled switch is able to maintain open said first controlled switch in the case in which the voltage present at said output terminal is higher than said first prefixed voltage.

3. Start up circuit according to claim 1, further comprising a second controlled switch having a terminal connected to said first node and a terminal connected to said output terminal; a first control circuit of said second controlled switch is able to maintain open said second controlled switch when the voltage present at an enable terminal of said start up circuit is higher than a second prefixed voltage.

4. Start up circuit according to claim 3, wherein said first control circuit of said second controlled switch is able to maintain closed said second controlled switch when the voltage present at said enable terminal is lower than said second prefixed voltage.

5. Start up circuit according to claim 1, further comprising a second control circuit of said second controlled switch able to maintain open said second controlled switch when the voltage present at said input terminal is lower than a third prefixed voltage.

6. Start up circuit according to claim 5, wherein said second control circuit of said second controlled switch is able to maintain closed said second controlled switch when the voltage present at said input terminal is higher than said second prefixed voltage.

7. Start up circuit according to claim 3, further comprising a second control circuit of said second controlled switch able to maintain open said second controlled switch when the voltage present at said input terminal is lower than a third prefixed voltage; and wherein the output of said first controller circuit and of said second control circuit are applied to an AND gate input, the output of said AND gate controls said second controlled switch.

8. Commutation power supply comprising:

a control circuit with amplitude modulation of the pulses;

a first current generator able to supply a first prefixed current connected between said input terminal and a first node; wherein said first node is coupled to said output terminal;

a second current generator able to supply a second prefixed current connected between said input terminal and a first terminal of a first controlled switch;

the value of said second prefixed current is greater than or equal to the value of said first prefixed current;

a second terminal of said first controlled switch is connected to said first node; and a control circuit of said first controlled switch is able to maintain closed said first controlled switch when the voltage on said output terminal is lower than a first prefixed voltage.

9. Commutation power supply according to claim 8, further comprising:

a second controlled switch having a terminal connected to said first node and a terminal connected to said output terminal;

a first control circuit of said second controlled switch able to maintain open said second controlled switch when the voltage present at an enable terminal of said start up circuit is higher than a second prefixed voltage, wherein a second control circuit of said second controlled switch is able to maintain open said second controlled switch when the voltage present at said input terminal is lower than a third prefixed voltage, and the output of said first controller circuit and of said second control circuit are applied to an AND gate input, the output of said AND gate controls said second controlled switch.

10. Commutation power supply according to claim 8 wherein said first prefixed voltage is lower than the working threshold of said pulse amplitude modulation control circuit.

11. Commutation power supply according to claim 9 wherein said second prefixed voltage is higher than a voltage that indicates that said control circuit with pulse amplitude modulation is working.

* * * * *